United States Patent [19]

Beavers

[11] 3,968,809

[45] July 13, 1976

[54] VAN TENT FOR OPEN-ENDED VANS

[75] Inventor: Allan E. Beavers, Littleton, Colo.

[73] Assignee: T. A. Pelsue Company, Englewood, Colo.

[22] Filed: May 27, 1975

[21] Appl. No.: 580,932

[52] U.S. Cl. .............................. 135/4 A; 135/1 A; 135/3 A; 135/5 A; 296/23 MC; 296/26
[51] Int. Cl.² ...................... A45F 1/06; A45F 1/16
[58] Field of Search ........... 135/1 A, 3 A, 4 A, 5 A, 135/7.1 A; 296/23 MC, 26

[56] References Cited
UNITED STATES PATENTS

| | | | |
|---|---|---|---|
| 2,113,294 | 5/1938 | Dotten | 135/5 A |
| 2,615,458 | 10/1952 | Jones | 135/4 A |
| 3,020,919 | 2/1962 | Crump | 135/1 A |
| 3,186,419 | 6/1965 | McCarroll | 135/1 A |
| 3,525,290 | 8/1970 | Pelsue | 135/4 |
| 3,810,482 | 5/1974 | Beavers | 135/4 R |
| 3,863,977 | 2/1975 | Hardinge | 135/1 A |

FOREIGN PATENTS OR APPLICATIONS

| | | | |
|---|---|---|---|
| 273,953 | 3/1966 | Australia | 135/1 A |
| 820,808 | 9/1959 | United Kingdom | 135/1 A |
| 1,220,683 | 1/1971 | United Kingdom | 135/1 A |
| 1,024,233 | 3/1966 | United Kingdom | 135/1 A |

Primary Examiner—Werner H. Schroeder
Assistant Examiner—Conrad L. Berman
Attorney, Agent, or Firm—Edwin L. Spangler, Jr.

[57] ABSTRACT

This invention relates to a tent-like foldable room-forming extension for rear-opening van-type vehicles characterized by hanger brackets mountable on the upper rear outside corners of the van; a foldable subframe having its adjacent front corners fitted with eyelets detachably connctable to the hanger brackets to define a roof-supporting structure, foldable subframes depending from the side margins of the roof-supporting subframe and cooperating therewith to define an arch, a foldable fabric skin covering, the top and sides of said frame as well as the opening at the rear with an openable curtain wall, a forwardly-extending sealable cuff at the front end adapted to be drawn snug against the rear end of the van, and an expandable panel stretched between the sidewalls along the underside of the van cooperating therewith to enclose the front. This cuff allows the tent to be connected to vans having rear ends of different heights, widths and configurations. The sideframe members of the tent rest upon the ground when the tent is used on panel vans and cooperate therewith to produce a free-standing assembly. With step-in vans, on the other hand, the sidewalls hang free from the roof and channel brackets are used on the van body near the bottom to maintain a fixed spacing therebetween.

12 Claims, 10 Drawing Figures

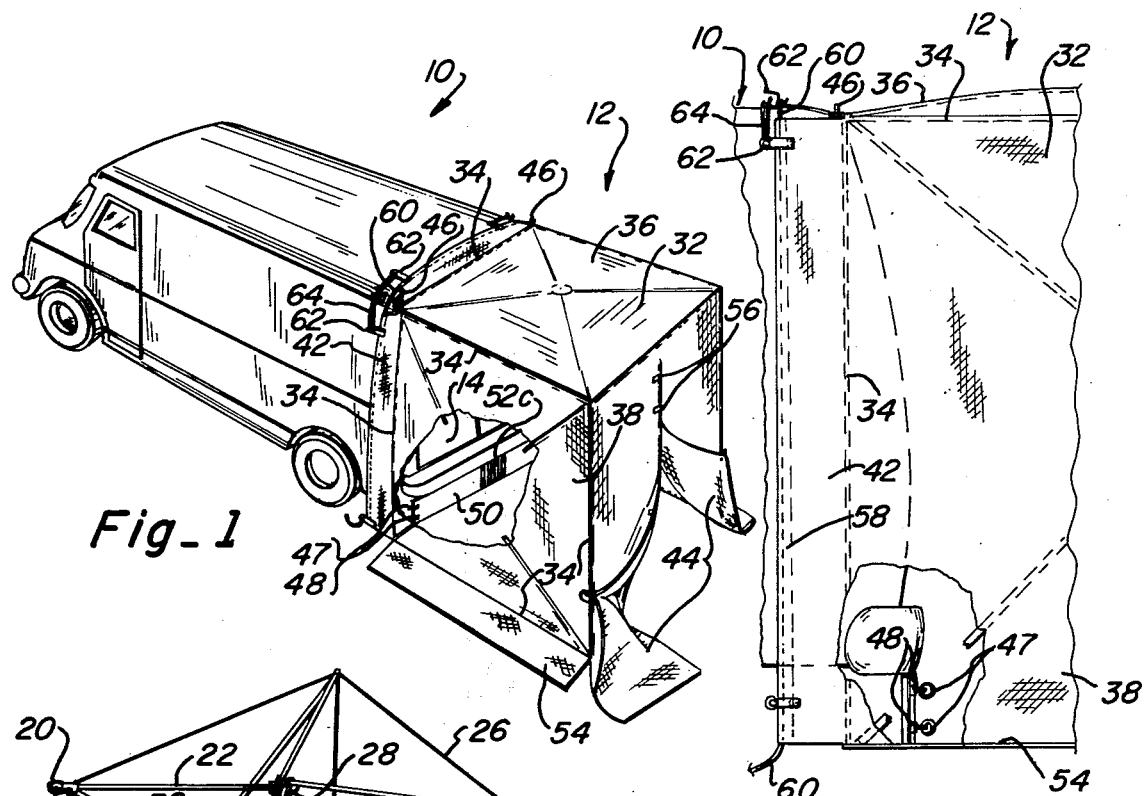
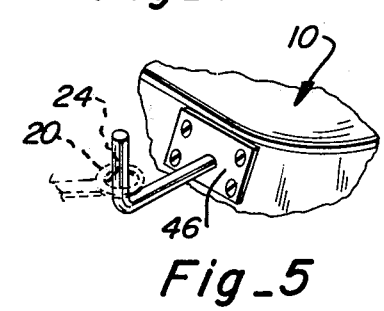
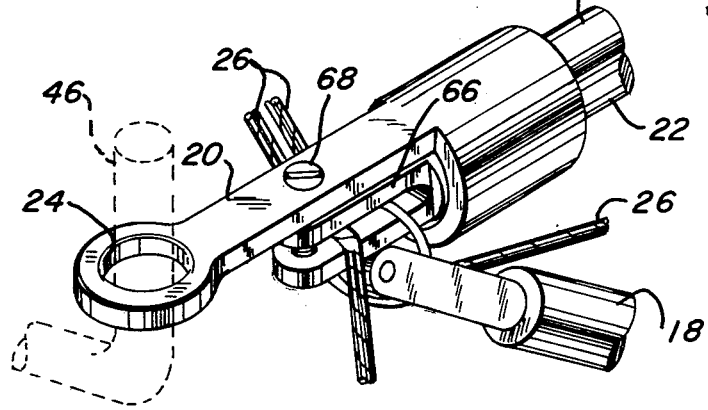
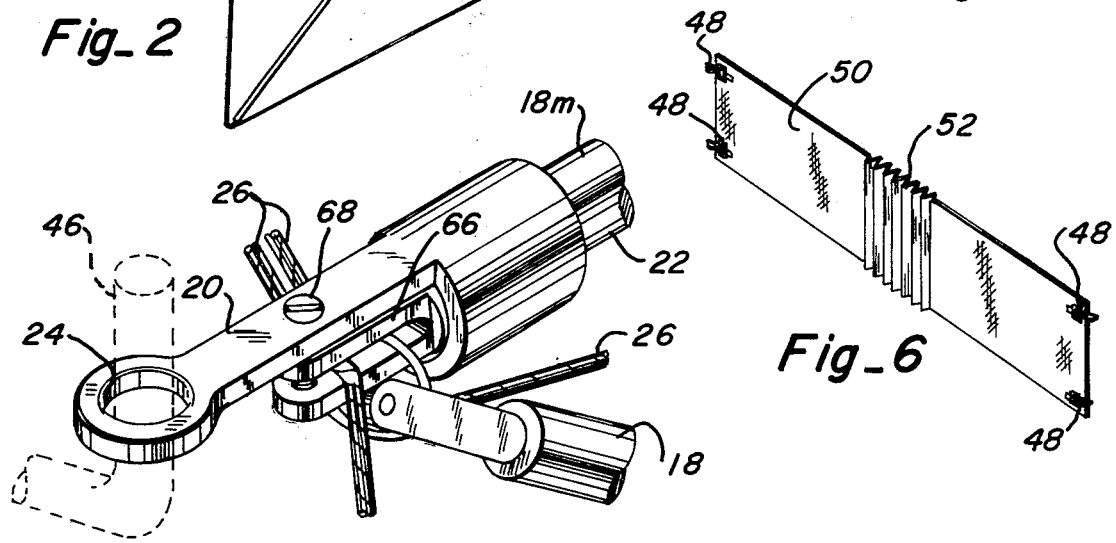

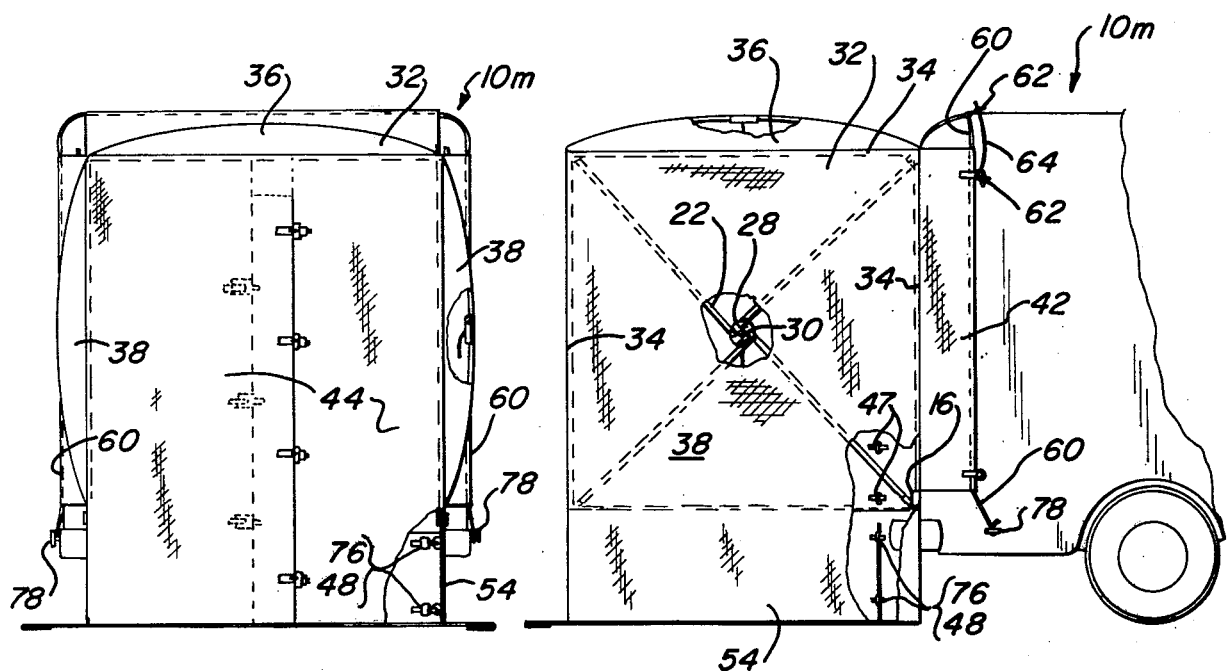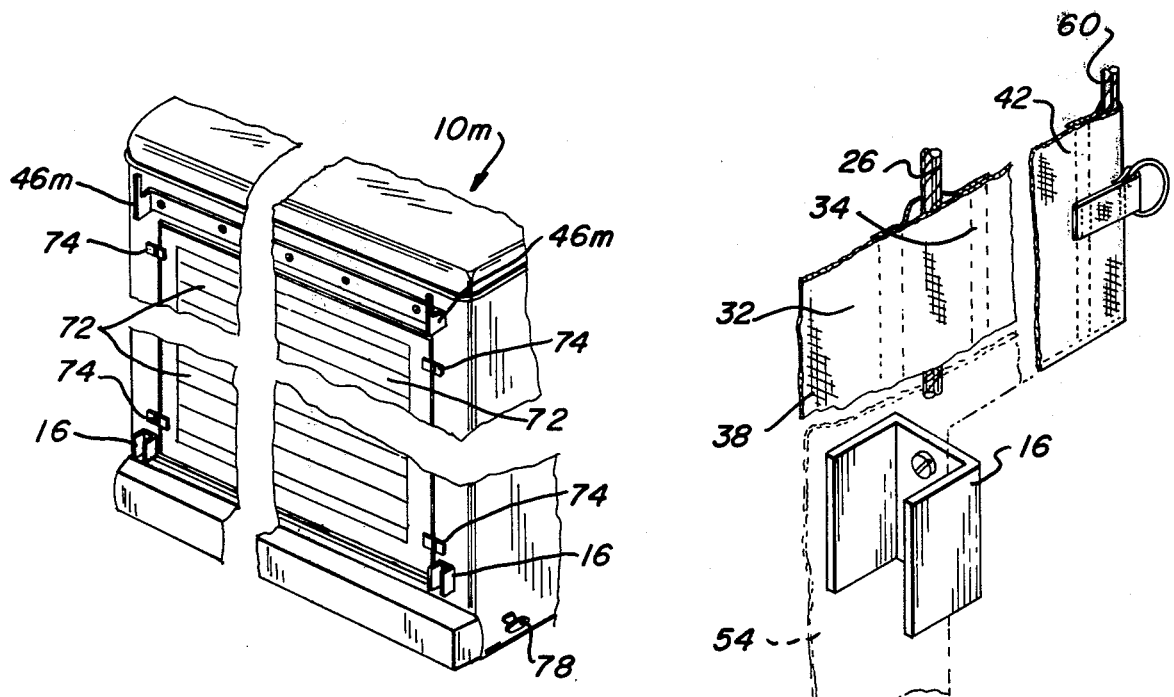

VAN TENT FOR OPEN-ENDED VANS

In my U.S. Pat. No. 3,810,482 issued May 14, 1974, I disclose a free-standing tent structure which has a frame made up of four substantially identical foldable subframes linked together at the corners so as to define skeletal supports when unfolded for curtain walls on both sides and at the rear along with a roof. I also have a copending application Ser. No. 519,624, filed Oct. 31, 1974, wherein I disclose an improved apparatus of the same general type which has certain advantages over the one forming the subject matter of my earlier patent already identified. The instant invention, on the other hand, relates to a specific type of tent, namely one used to form a foldable extension for an open-ended van-type vehicle, which tent can use either the subframe of my earlier patent or that forming the subject matter of my copending application provided that the subframe which supports the roof is suitably modified to include connector elements on the corners at the front end thereof. The tent structure alone is in a state of unstable equilibrium as it has rigid frame members only in the sides and roof; however, upon attachment to the rear end of the van, the resulting assembly assumes a free-standing stable condition, the van providing the rigid structure that links the sidewall subframes together.

The entire front end of the tent is left open and it enables the workmen to move back and forth between the tent and van at will. Furthermore, the entire bottom of the tent is also left open so that it can be set up over the entrance to underground workings such as manholes and the like. Heater-ventilator units can be left mounted inside the van and a flexible conduit run out the open van doors and down through the manhole. The workmen have ready access to their tools and supplies, all without going out-of-doors into the cold. While egress from the combination unit can be had through the openable flaps defining a curtain wall at the rear of the tent, these are usually left closed, especially during inclement weather.

The sidewalls of the tent reach all the way to the ground and no provision is made for staking them down for the obvious reason that the tent is ordinarily used over manholes in paved streets into which stakes cannot be driven. Since the tent will be used with vans of various heights and widths, specially designed roof and sidewalls accommodate such differences. The hanger brackets into which the eyes in the roof subframe hook are located a minimum height above ground level selected such that the foldable sidewall subframes will just barely reach same and be supported thereby. Both sidewalls are equipped with skirt-like extensions along their bottom edges which, in the case of the mimimum height van, merely lay out along the ground where, if necessary, they can be anchored down with sandbags, rocks or other available weights. The prime purpose of these skirts, however, is to accommodate the use of the tent on vans that are higher than normal. The roof of the tent must, of necessity, be above the level of the rear van doors so that they can be opened and, as such, the sidewalls and rear endwall would not reach the ground in the absence of such skirts. In overheight vans when the tent sidewalls do not reach all the way to the ground, additional channel brackets are provided on the lower outside corners to keep the sidewalls a fixed distance apart under the influence of the stretched front wall flap. In this condition, the elements of the sidewall subframes extending upwardly from the lower rear corners of the van to the upper rear corners of the roof define compression struts effective to support the tent in awning-like fashion.

The curtain wall at the rear end of the tent is devoid of a rigid subframe found in the sidewalls and roof but, instead, includes only openable flaps. With no rigid frame in either the front or rear walls of the tent, it is unstable in free-standing condition by itself and the van body supplies the missing framework necessary to maintain same in such a stable configuration. The height of the openable flaps is the same as the sidewalls including the skirts so that the rear wall of the tent will reach the ground and leave no gap therebeneath.

The absence of a front wall in the tent presents somewhat of a problem due to the passage of air into the tent through the considerable gap left between the ground and the van chassis. This problem has been solved, however, by the provision of a novel partial front wall in the form of a pleated expandable flap stretched between the sidewalls along the open space beneath the van chassis. Provision is made on the inside of the sidewalls for fastening the flap at different heights thereon.

While the tent can be raised or lowered to accommodate van bodies of various heights as aforementioned, provision must be made for adapting same for connection to vans having rear ends of different shapes and widths also. This has been accomplished in a unique manner by providing the sidewalls and roof with forwardly-extending flaps which cooperate with one another when connected together to produce a flexible cuff that will conform to and seal against the rear end of any of the standard van bodies used as service vehicles in the public utilities industry. Gaps of several inches left between the van body and main room-forming portion of the tent can be bridged and closed with the extendable cuff.

When the tent is used on average walk-in style vans, the sidewall subframes do not extend all the way to the ground in contrast to a panel van. It is for this reason that the sidewalls more or less hang free from the roof and are at liberty to tilt forward and away from one another unless restrained. Brackets on the lower outside corners at the rear of the van receive the vertically-extending edges of the sidewalls and maintain a fixed spacing therebetween.

Accordingly, it is the principal object of the present invention to provide a novel and improved van tent.

A second objective is the provision of a novel stretchable panel or flap defining a partial front wall sealing the gap between the van chassis and the ground.

Another objective is the provision of a collapsible room-like extension for public utility service vans that provides shelter for the workmen as well as direct access to both the van body and underground installations without having to go out-of-doors.

Still another object is to provide a tent of the type described which will accommodate vans of various heights and shapes due to its unique forwardly-extending flexible cuff.

An additional objective is the provision of a device of the class aforementioned which can be erected in a matter of a few seconds and sealed against the van body a minute or two later.

Further objects are to provide a van tent that is compact, lightweight, rugged, adaptable without modification to various sizes and configurations of van-type vehicles, one that is rugged, easy to erect, virtually weatherproof and even decorative, and a unit that does not interfere in any way with normal use of the van.

Other objects will be in part apparent and in part pointed out specifically hereinafter in connection with the description of the drawings that follows, and in which:

FIG. 1 is a perspective view looking down and to the right upon the rear end of a panel van to which the van tent of the present invention has been added, portions of the left sidewall of the tent having been broken away to expose the internal construction;

FIG. 2 is a perspective view to an enlarged scale showing the tent frame alone as it appears looking down upon it from a vantage point above and to the right of its open front end;

FIG. 3 is a further enlarged fragmentary side elevation showing in detail the manner in which the tent is attached to the rear end of a so-called panel van so that the frame rests upon the ground, portions of the sidewall having been broken away to reveal the interior construction;

FIG. 4 is a still further enlarged fragmentary perspective showing the ends of the roof subframe struts at the front of the tent fitted with eye-type connectors;

FIG. 5 is a fragmentary perspective view to a smaller scale than FIG. 4 but larger than FIGS. 1, 2 and 3 showing the hanger bracket attached to the van body that detachably receives the eye on the end of the roof subframe struts;

FIG. 6 is a perspective view to approximately the same scale as FIG. 2 showing the expandable front panel;

FIG. 7 is a rear elevation to approximately the same scale as FIG. 1 showing the tent attached in place on a walk-in van, portions of the rear wall and cuff having been broken away to expose the interior construction;

FIG. 8 is a fragmentary side elevation to the same scale as FIG. 7, portions of the sidewall having been broken away to better reveal the interior construction;

FIG. 9 is a fragmentary perspective view of the rear end of a walk-in van as seen from a vantage point above the right rear corner thereof, portions having been broken away to conserve space; and, FIG. 10 is a greatly fragmentary perspective view showing the channel brackets fastened to the walk-in vans as a means for keeping the sidewalls hanging from the roof a fixed distance apart.

Referring next to the drawings for a detailed description of the present invention, reference numeral 10 has been chosen to broadly designate a van-type public utility service truck equipped for use in the repair and maintenance of underground installations accessible through manholes in the street or roadway, whereas, reference numeral 12 has been selected to similarly designate the van tent that forms a room-like temporary extension at the rear open end 14 of such vehicles. The van shown in FIGS. 1 and 3 is of the so-called "panel" type in which a full-sized adult cannot stand erect and is, therefore, used primarily for the storage of tools, supplies and equipment. By way of contrast, the van 10M of FIGS. 7, 8 and 9 is considerably larger and is known in the trade as a "walk-in van" for the obvious reason that an adult workman can stand erect in such a vehicle and even use it as a mobile workshop. The significant difference between these two types of vans for present purposes, however, is strictly one of size and, more particularly, height, width and shape because the van tent 12 of the present invention mounts somewhat differently on the two as will appear presently.

Irrespective of the particular van style with which the tent 12 is used, it remains essentially unchanged except for the need for an additional pair of mounting brackets 16 when it is used on the larger of the two vans 10M, all of which will become apparent presently in connection with the detailed description of FIGS. 6 and 7. In the meantime, with specific reference to FIG. 2, it will be seen that the sidewall subframe assemblies 18 are identical while the roof subframe 18M is slightly modified to include fittings 20 on the terminal ends of the forwardly-extending pair of struts or ribs 22 that define the eyes 24 which are most clearly revealed in FIG. 4. As disclosed in my patent and pending application previously identified, each of these struts or ribs 22 is rigid yet preferably able to bend slightly under the influence of the stretchable cord 26 that connects the outboard or remote ends thereof together.

In the fully unfolded condition shown, the strut pairs running more or less diagonally across the subframe bear an angular relation to one another that exceeds 180° and in this "over-center" condition, they are held against the stop-defining margin 28 of the central hub 30 to which they are pivotally connected. This fully unfolded condition is a stable one for the subframe as the cord 26 is stretched taut and is continually under some tension. To collapse or fold the subframe, one grasps the hub from the inside of the tent and pulls it inwardly, whereupon, the hub will move through a position where all the struts lie in coplanar relation to one another and on to a folded condition (not shown) wherein the struts are nested in side-by-side bundle-forming relation with the hub at one end. The foldable fabric skin 32 that covers the frame and cooperates therewith to produce the tent is actually permanently fastened to the subframe 18 by running cord 26 through hemmed passages 34 located at the juncture between the roof 36 and sidewalls 38, down along the rear edge of the latter, then along the bottom, where flap-like extensions join into the bottom margin of the sidewalls, and finally up along the front edge when the flexible cuff 42 adjoins the sidewalls. In addition, to facilitate the folding operation, the walls and roof are preferably connected to the hub at the center of the subframes 18. The subframes and skin 32 covering same produces a unitary assembly but one which is relatively unstable by itself even with the flaps 44 of the rear curtain wall closed. It is only when the tent 12 is mounted on the rear end of the van 10 that the stability required is achieved. Reference will next be made to FIGS. 1, 2, 5 and 6 for a detailed description of how such connection is made to a panel van.

To begin setting up the tent, the user gets inside and with the sidewall subframes 18 still collapsed, unfolds the roof subframe 18M. Next, the eyes 24 in the fittings 20 added to the terminal ends of the forwardly-extending roof struts 22 are hooked over hanger brackets 46 that have been previously mounted on the upper outside corners at the rear of the van. One form of such a hanger bracket 46 is shown in FIG. 5 and will be seen to comprise nothing more than an upturned metal hook. The space separating the sidewalls is selected such that it is about the same as the width of a panel van, therefore, the hanger brackets can be mounted on the sides of the van as shown rather than on the rear wall which is the case with modified hanger bracket 46M used on the walk-in van 10M illustrated in FIG. 9 to which reference will be made presently. The height at which these hanger brackets are mounted on the sides of the van is selected to be equal to the unfolded height of the sidewalls 38 so that they will rest upon the ground as in FIGS. 1 and 3.

Inside each sidewall of the tent adjacent the front edge thereof is sewn a pair of D-rings 47 (FIG. 8) spaced to accomodate the snap fasteners 48 on the ends of expandable panel 50, the latter having been shown in FIG. 6 to which reference will now be made. The height of this panel 50 is such as to form a partial front wall blocking off the flow of air into the tent underneath the van chassis. The center of this panel is provided with an expandable pleated section 52 normally held in the pleated condition by elastic members (not shown). The width of the panel before expansion is substantially less than that necessary to reach from one sidewall to the other as they are placed alongside a panel van 10 as shown in FIG. 1. The amount of bias exerted upon the panel is enough to keep it from sagging, yet, is insufficient to pull the sidewalls in toward one another especially with the subframes resting upon the ground. In this way, no restraints need be placed upon the sidewalls at the bottom of the van as are necessary with the walk-in van 10M to be described presently.

The skirts 54 along the bottom edges of both sidewalls merely lay out along the ground when the tent is used with a panel van as shown in FIGS. 1 and 3 to which reference will now be made. They can be left inside the tent or outside as shown. While nothing has been illustrated anchoring these flaps down, this is no problem should the need therefor arise. In FIG. 1 it can be seen that the flaps 44 defining the frameless curtain wall at the rear end of the tent are the same length as the sidewalls plus the skirts 54 so as to reach all the way to the ground when the unit is used with a walk-in van. By leaving the bottom few fasteners 56 used to close the flaps unfastened, the bottom margins of these flaps can be laid out on the ground just like the skirts 54.

In FIGS. 1 and 3, it will be seen that the cuff 42 is formed by providing both sidewalls and the roof with forwardly-extending flap-like extensions hemmed along their front marginal edges to produce a drawstring passage 58 housing a drawstring 60. These flap-like extensions are also fitted with D-rings 62 adjacent the upper rear corners of the van by means of which adjacent extensions are connected together across the corner of the van roof with a length of cord or other fastening means 64. The free ends of drawstring 60 emerging from the lower end of the hemmed passage 58 in the sideflaps are passed underneath the chassis of the van and tied together to draw the cuff 42 up snug around the rear end of the van body.

Briefly with reference to FIG. 4, fitting 20 comprises a sleeve telescoped over the end of strut 22 and fastened to the bifurcated end 66 with a fastener 68 that provides the dual function of keeping the stretchable cord 26 in place. The fastener actually passes through an elongated integrally-formed arm 70 that terminates in the eye 24. This fitting together with hanger bracket 46 cooperate to define but one of many types and styles of quick-disconnect couplings well known in the art that would function equally well for the same purpose.

Next with reference to FIGS. 7-10, inclusive, the use of the van tent 12 with a walk-in type van 10M will be described in detail. This type of van is, under most circumstances, both wider and higher than the panel van 10 of the previously-described figures. As such, in order to be able to open the van doors 22, the roof 36 of the tent must be mounted above the top edge of the doors, while the sidewalls 38 of the tent must be outside its hinges 74, which means, of course, that the same size tent used with the panel van will no longer be high enough for its frame to rest upon the ground. A different type of hanger bracket 46M is shown mounted along the top edge of the van body having hooks at opposite ends thereof adapted to receive the forwardly-extending roof struts 22, as before. While the structure of the hanger bracket 46M is somewhat different, it functions in the same way and hooks at its extremities are spaced the same distance apart so as to accommodate the spacing between the roof subframe eyes 24 that remains fixed. Obviously, the spacing between the sidewalls must exceed the combined width of both doors or they cannot be opened. Note, however, that the tent is raised a good deal higher off the ground in order to accommodate the higher doors, therefore, the sidewall subframes can no longer reach or rest upon the ground, but instead, they more or less hang free from the roof. As such, they are free to move toward and away from one another despite the fact that the cuff 42 envelopes the rear end of the van body and presents any great deal of relative movement therebetween. It has been found desirable, therefore, to equip the rear end of the step van body with rearwardly-opening vertically-disposed channel brackets 16 located alongside the doors near the bottom edges thereof. The cuff-forming flaps 42 terminate above these brackets (see FIG. 8) so that the front margins of the sidewalls 32 thus exposed will slip into these channels as shown.

Now, with the tent raised up off the ground, the skirt-like extensions 54 hanging down beneath the sidewalls are needed to enclose the sides thereof. The flaps 44 at the rear wall are long enough to reach the ground also. With the tent higher off the ground, however, the upper pair of D-rings 47 on the inside of the sidewalls cannot be used and a second pair 76 must be employed as the points of attachment for snap fasteners 48 as shown in FIGS. 7 and 8. Otherwise, flap 50 and its pleated section 52 function in exactly the same way as with the panel van 10.

Generally speaking, the step-in vans are somewhat wider than the panel vans and, for this reason, the cuff 42 will not extend as far forward into the body. Nevertheless, it is drawn up snugly thereagainst with drawstring 60 and cords 64 in the same way as has already been described except that, in the particular form shown in FIGS. 7 and 8, instead of tying the free ends of drawstring 60 together underneath the chassis, an alternative arrangement is shown in which they are individually secured to brackets 78 mounted on the sides of the van.

With the tent free of the ground insofar as the sidewall subframes resting thereon, the struts 22 of the latter extending diagonally upward from the rear of the van support the roof in awning-like fashion. The sidewalls and rear endwall, of course, hang down from the roof to the ground.

What is claimed is:

1. A tent for use in combination with a rear-opening van-type vehicle to form a temporary room-like extension at the rear end thereof which comprises: a first foldable rigid subframe including intersecting diagonally-disposed pairs of jointed struts, a hub located at the intersection of the strut pairs, and stretchable means successively interconnecting the ends of the struts remote from the hub cooperating therewith and with said hub to releasably maintain said frame in an unfolded generally rectangular configuration; means for detachably connecting the first subframe to the upper outside corners at the rear of the van body depending from the front corners of said first subframe; second and third foldable rigid subframes attached to opposite side margins of the first subframe in supporting relation therebeneath; a first fabric panel covering the first subframe and cooperating therewith to define a roof; second and third fabric panels covering the second and third subframes cooperating therewith to produce sidewalls; fabric flaps extending forwardly from the front margins of the roof and sidwall panels into position atop and alongside the van body; and, means carried by the forward edges of the flaps connecting them together and cooperating therewith to define a retractable cuff sealable against the side and top of the van.

2. The van tent as set forth in claim 1 in which: skirt-forming fabric extensions depend from the bottom margins of the second and third fabric panels, said extensions providing means for anchoring the tent to the ground when laid out thereon and said extensions further providing means for bridging the gaps beneath the sidewalls when the tent is mounted in an elevated position such that the second and third subframes terminate short of the ground.

3. The van tent as set forth in claim 1 in which: the first, second and third subframes cooperate with one another and with the van body when fastened thereto to define a free-standing assembly.

4. The van tent as set forth in claim 1 in which: the means connecting the cuff-forming flaps together comprises a drawstring and said forward flap edges are hemmed to receive same.

5. The van tent as set forth in claim 1 in which: a fabric strip is detachably connected between the front margins of the sidewalls positioned and adapted to define a partial front wall effective to seal the gap left between the underside of the van chassis and the ground.

6. The van tent as set forth in claim 5 in which: means are provided on the lower front corners of the sidewalls to detachably receive the upper outside corners of the strip and suspend same in skirt-forming relationship therebeneath.

7. The van tent as set forth in claim 3 in which: the strip includes a vertically-disposed longitudinally-expandable pleated section and stretchable means attached to said pleated section normally biasing the latter into a foreshortened condition.

8. The van tent as set forth in claim 7 in which: the horizontal dimension of the strip when in retracted condition is less than the distance separating the sidewalls so as to maintain said strip under tension when connected to bridge the space between the latter.

9. The van tent as set forth in claim 1 in which: the second and third subframes include a rigid jointed strut extending downwardly and forwardly in roof-supporting relation to a fixed support on the rear end of the van body or the ground.

10. The van tent as set forth in claim 9 in which: the jointed struts of the second and third subframes fold inwardly toward one another.

11. The van tent as set forth in claim 1 in which: the first, second and third subframes are substantially identical.

12. The van tent as set forth in claim 11 in which: the first, second and third subframes all fold inwardly in umbrella-like fashion.

* * * * *